United States Patent
Dempsey

(10) Patent No.: US 8,177,538 B1
(45) Date of Patent: May 15, 2012

(54) TIRE MOLD HAVING SIDEWALL STRUCTURE

(75) Inventor: John E. Dempsey, Mogadore, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 13/052,218

(22) Filed: Mar. 21, 2011

(51) Int. Cl.
*B29C 33/42* (2006.01)
(52) U.S. Cl. .......................... 425/28.1; 425/46; 425/195
(58) Field of Classification Search .............. 425/28.1, 425/35, 46, 47, 195
See application file for complete search history.

(56) References Cited

U.S. PATENT DOCUMENTS

| | | | | |
|---|---|---|---|---|
| 2,333,588 | A | * | 11/1943 | Schaevitz .................. 425/46 |
| 3,082,480 | A | * | 3/1963 | Balle ........................ 425/46 |
| 3,562,861 | A | * | 2/1971 | Youngblook ............... 425/55 |
| 4,553,918 | A | * | 11/1985 | Yoda et al. ................. 425/46 |
| 4,576,559 | A | * | 3/1986 | Yoda et al. ................. 425/28.1 |
| 5,190,767 | A | | 3/1993 | Beres et al. |
| 5,769,976 | A | | 6/1998 | Omokawa et al. |
| 5,939,002 | A | * | 8/1999 | Heindel ..................... 425/47 |
| 6,189,586 | B1 | | 2/2001 | Guidry |
| 6,386,652 | B1 | | 5/2002 | Bonko |
| 6,551,086 | B1 | | 4/2003 | Tuttle et al. |
| 6,632,393 | B2 | | 10/2003 | Fike |
| 6,640,858 | B2 | | 11/2003 | Ikeda |
| 6,872,271 | B2 | | 3/2005 | Nowotarski |
| 6,955,782 | B1 | | 10/2005 | Ratliff, Jr. |
| 7,114,546 | B2 | | 10/2006 | Ward |
| 7,513,762 | B2 | | 4/2009 | McBride |
| 7,628,599 | B2 | | 12/2009 | Girard et al. |
| 7,637,296 | B2 | | 12/2009 | Bonko et al. |
| 7,802,975 | B2 | | 9/2010 | Currie et al. |
| 7,857,926 | B2 | | 12/2010 | Nobuchika et al. |
| 7,874,821 | B2 | | 1/2011 | Ohara |
| 2003/0230370 | A1 | | 12/2003 | Stubbendieck et al. |
| 2004/0018262 | A1 | | 1/2004 | Reep et al. |
| 2006/0129377 | A1 | | 6/2006 | Nash |
| 2008/0237929 | A1 | | 10/2008 | Sher |
| 2008/0257468 | A1 | | 10/2008 | Ohara |
| 2009/0107596 | A1 | | 4/2009 | Palinkas et al. |
| 2010/0186858 | A1 | | 7/2010 | Gallego et al. |
| 2010/0200135 | A1 | | 8/2010 | Ohara |

* cited by examiner

*Primary Examiner* — James Mackey
(74) *Attorney, Agent, or Firm* — Matthew W. Jupina; Bryan Jaketic

(57) ABSTRACT

An apparatus for molding a tire includes a first mold section having a first cavity, with an annular ridge disposed thereon. The apparatus also includes a second mold section having a second cavity. A plurality of lugs are removably attached to the first mold section. The apparatus further includes a ring having a plurality of projections, wherein the lugs retain the ring in a fixed position against the first mold section about the annular ridge.

20 Claims, 8 Drawing Sheets

TIRE MOLD HAVING SIDEWALL STRUCTURE

FIELD OF INVENTION

The present disclosure relates to the field of tire molding. More particularly, the present disclosure relates to a tire mold for forming voids in a tread and sidewall of a tire.

BACKGROUND

Tire molds are used to vulcanized uncured or green tires. The molds may have a top mold section and a bottom mold section, having top and bottom cavities, respectively, within which the green tire is vulcanized. Tread forming elements and void forming members may be attached to the top and bottom mold sections to impart voids, grooves, sipes, patterns, and lettering onto the tire.

SUMMARY OF THE INVENTION

In one embodiment, a tire mold kit includes a bottom mold section having a bottom cavity configured to define a first sidewall of a tire and a first portion of a tread of a tire. The tire mold kit also includes a top mold section having a top cavity configured to define a second sidewall of the tire and a second portion of the tread of the tire. A plurality of void forming members are removably attached to the top mold section, and retain a top ring in a fixed position against the top mold section. The top ring has a plurality of projections configured to form voids in the second sidewall of the tire.

In another embodiment, a tire mold includes a bottom mold section having a bottom cavity, a plurality of bottom lugs removably attached to the bottom mold section, and a bottom ring having a plurality of projections. The plurality of bottom lugs retain the bottom ring in a fixed position against the bottom mold section, and each of the projections of the bottom ring is adjacent one of the bottom lugs. The tire mold further includes a top mold section having a top cavity, a plurality of top lugs removably attached to the top mold section, and a top ring having a plurality of projections. The plurality of top lugs retain the top ring in a fixed position against the top mold section, and each of the projections of the top ring is adjacent one of the top lugs.

In yet another embodiment, an apparatus for molding a tire includes a first mold section having a first cavity, with an annular ridge disposed thereon. The apparatus also includes a second mold section having a second cavity. A plurality of lugs are removably attached to the first mold section. The apparatus further includes a ring having a plurality of projections, wherein the lugs retain the ring in a fixed position against the first mold section about the annular ridge.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
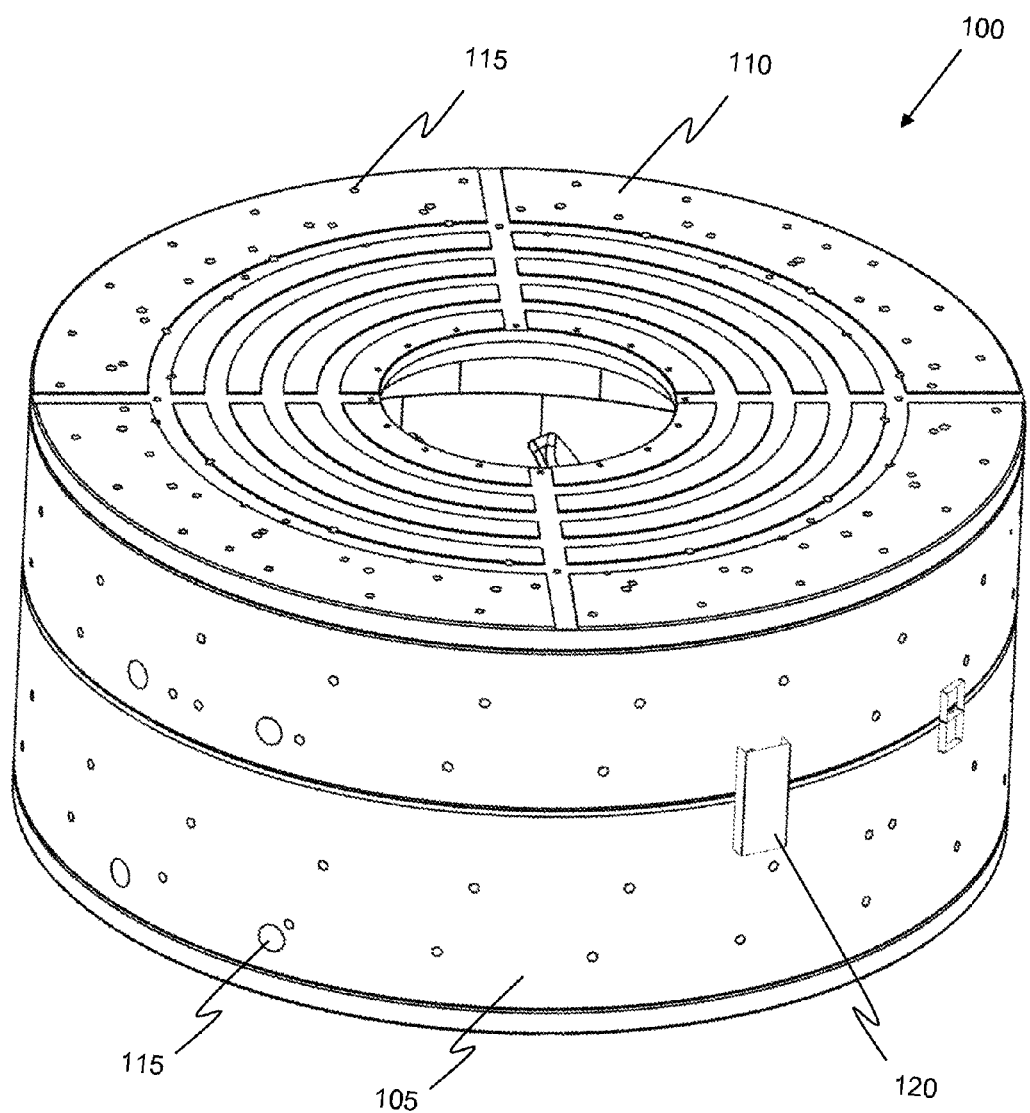
FIG. 1 is a perspective view of one embodiment of a tire mold.

FIG. 1 illustrates a perspective view of one embodiment of a tire mold 100 having a bottom mold section 105 and a top mold section 110. The bottom mold section 105 has a bottom cavity configured to define a first sidewall of a tire and a first portion of a tread of a tire (not shown). The top mold section 110 has a top cavity configured to define a second sidewall of the tire and a second portion of the tread of the tire. It should be understood that the tire mold 100 need not be oriented as depicted, but instead may be rotated. For example, the tire mold 100 may be rotated by 90°, in which case the top and bottom sections depicted would be right and left sections. The terms "top" and "bottom" as well as "upper" and "lower" are therefore terms that are used for convenience, and are not intended to limit the tire mold to a particular orientation.

Each of the top and bottom mold sections 105, 110 include a plurality of apertures 115. Some of the apertures 115 are configured to receive fasteners for attaching tread forming elements and void forming elements (not shown) to inner surfaces of the top and bottom mold sections 105, 110. Additional apertures (not shown) may be used to vent air into or out of the cavities.

The tire mold 100 further includes a locking mechanism 120 for locking the bottom mold section 105 to the top mold section 110 during the curing process. In one embodiment, the bottom mold section 105 and top mold section 110 are placed in a pot heater (not shown) for vulcanizing the green tire. After vulcanization, the mold sections are manually separated. In an alternative embodiment, the bottom mold section 105 is pivotally connected to the top mold section 110. For example, the bottom mold section 105 may be connected to a bottom of a tire press and the top mold section 110 may be connected to a top of the tire press, where the top of the tire press is pivotally connected to the bottom of the tire press. In other alternative embodiments, the tire mold 100 may open by lowering the bottom mold section 105 or by raising the top mold section 110.

In one embodiment, the tire mold 100 has an outer diameter of 117 inches (297 centimeters) and a width of 55 inches (140 centimeters). In alternative embodiments, the tire mold may have an outer diameter ranging from 10 inches (25 centimeters) to 200 inches (508 centimeters) and a depth ranging from 2 inches (5 centimeters) to 100 inches (254 centimeters). It should be understood that such a tire mold may be scaled according to the type of tire that is desired, such as tires for a passenger car, a light truck, a sports utility vehicle, a motorcycle, an all-terrain vehicle, a truck, an airplane, agriculture equipment, mining equipment, industrial equipment such as a bulldozer, or any other type of tire.

Figure 2:
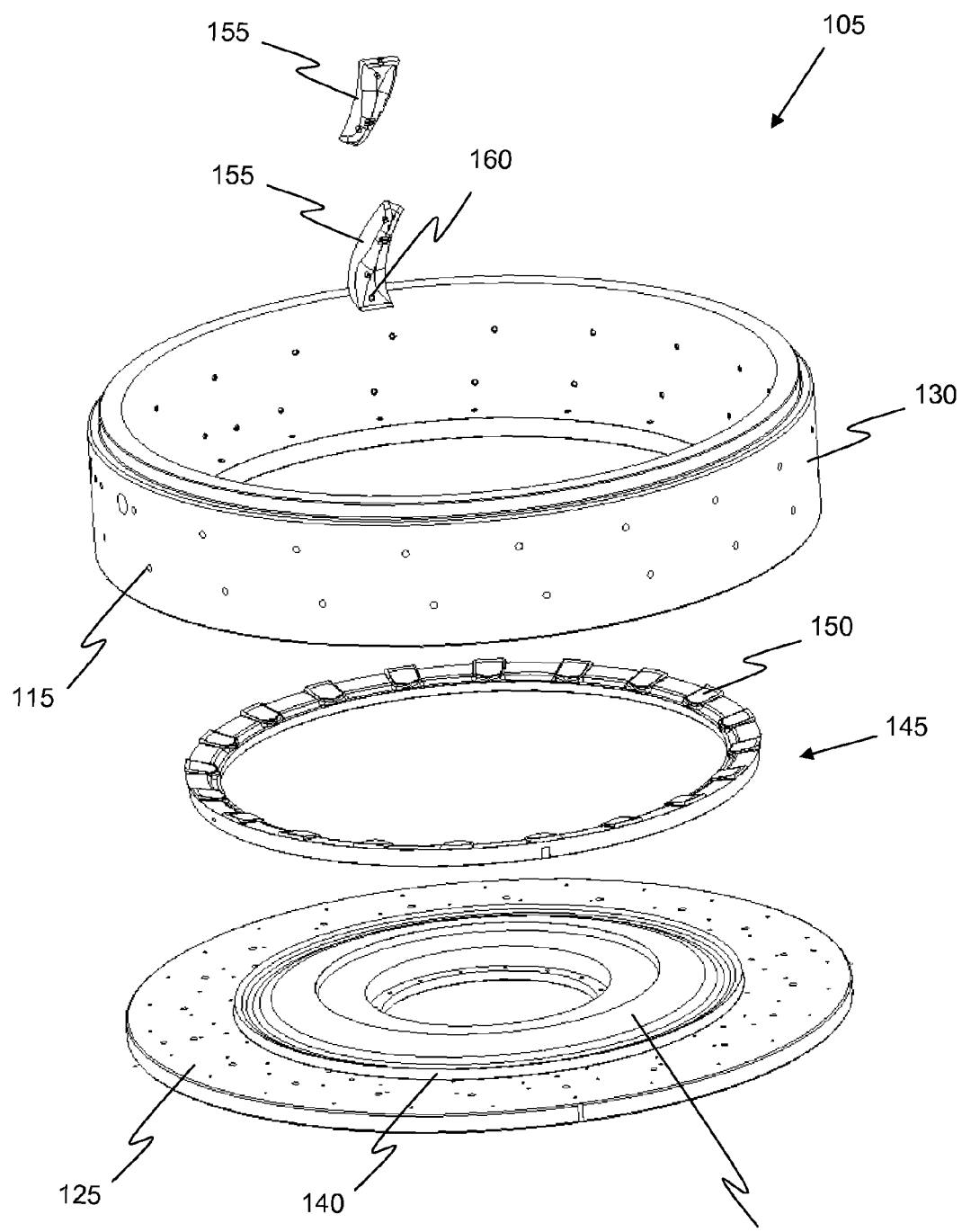
FIG. 2 is an exploded perspective view of one embodiment of a bottom mold section.

FIG. 2 illustrates an exploded perspective view of one embodiment of the bottom mold section 105. The bottom mold section 105 is comprised of a bottom disk 125 and a lower annular sidewall 130 that is connected to the bottom disk 125 to define the bottom cavity. In an alternative embodiment (not shown), the bottom mold section 105 is a unitary component having a base with an annular sidewall.

The bottom disk 125 includes a bottom annular ridge 135 disposed thereon. The bottom annular ridge 135 may also be referred to as a bottom annular rib. The bottom annular ridge 135 is configured to contact a sidewall of a green tire (not shown) and includes raised portions and indentations that will form complementary shapes on the sidewall of the green tire. The bottom annular ridge is defined by an outer ledge 140.

A bottom ring 145 is positioned against the bottom disk 125 about the bottom annular ridge 135, such that the interior edge of the bottom ring 145 abuts the outer ledge 140. The bottom ring 145 has a plurality of projections 150 that are configured to form voids in the first sidewall of the green tire. The bottom annular wall 130 may include an internal flange or lip (not shown in this view) that abuts the exterior edge of the ring 145, such that the bottom ring 145 is sandwiched between the bottom annular ridge 135 and the bottom annular wall 130.

In an alternative embodiment (not shown), the bottom disk 125 does not include a bottom annular ridge 135. In such an embodiment, the bottom ring 145 is simply positioned on the bottom disk 125 at a desired location. In such an embodiment, the bottom ring 145 may be broader, and include the raised portions and indentations that are shown on the bottom annular ridge 135 in FIG. 2. Alternatively, the bottom ring 145 may be replaced with a solid disk having the raised portions and indentations that are shown on the bottom annular ridge 135 in FIG. 2.

The bottom mold section 105 further includes a plurality of bottom lugs 155. The bottom lugs 155 are void forming members that are configured to form a void in the first sidewall or the tread of the green tire. In the illustrated embodiment, the plurality of bottom lugs 155 are removably attached to the bottom mold section 105. Each bottom lug may be attached to the bottom disk 125, the bottom annular sidewall 130, or both. Each bottom lug includes at least one aperture 160 configured to receive a fastener. Exemplary fasteners include bolds, screws, pegs, rivets, nails, or ties. In one known embodiment, at least one aperture 160 of each bottom lug 155 is aligned with an aperture 115 in one of the bottom disk 125 and the bottom annular sidewall 130, and a bolt (not shown) is passed through both apertures 115, 160 to secure the bottom lug 155 in position. The bolt may be fastened to a nut, or one or more of the apertures may be threaded. In an alternative embodiment (not shown), the bottom lugs 155 are fixedly attached to the bottom mold section 105. For example, the bottom lugs may be welded or riveted in place, or fixedly attached with an adhesive. Alternatively, the bottom lugs may be an integral extension of the bottom mold section 105.

In one embodiment, all of the bottom lugs 155 have substantially the same shape and dimensions. In one known embodiment, each bottom lug is approximately 5 inches (13 centimeters) deep, 4 inches (10 centimeters) wide, and 17 inches (43 centimeters) long. In an alternative embodiment, the bottom lugs 155 have a plurality of different shapes. The bottom lugs may have a depth ranging from 1 inch (3 centimeters) to 12 inches (30 centimeters), a width ranging from 1 inch (3 centimeters) to 12 inches (30 centimeters), and a length ranging from 3 inches (8 centimeters) to 40 inches (102 centimeters). However, it should be understood that the lugs may have any dimension for forming a void of a desired shape and dimension.

In one embodiment, at least some of the bottom lugs 155 are positioned such that they retain the bottom ring 145 against the bottom disk 125. In one particular embodiment, the bottom ring 145 does not have any apertures for receiving fasteners. The bottom lugs 155 may retain the bottom ring 145 with a friction fit. Alternatively, the bottom lugs 155 and the bottom ring 145 may be keyed, such that they have complementary projections and indentations to aid in retention.

Figure 3:
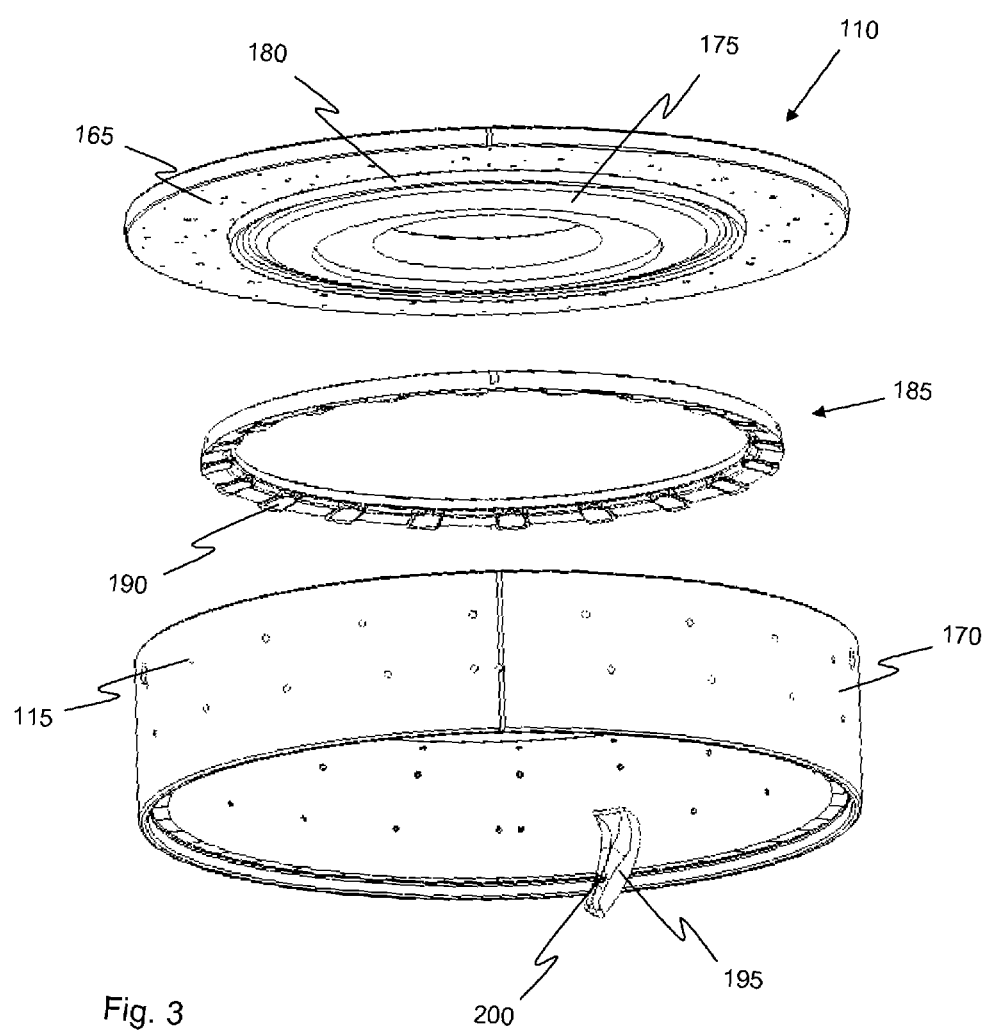
FIG. 3 is an exploded perspective view of one embodiment of a top mold section.

FIG. 3 illustrates an exploded perspective view of one embodiment of the top mold section 110. The top mold section 110 is comprised of a top disk 165 and an upper annular sidewall 170 that is connected to the top disk 165 to define the top cavity. In an alternative embodiment (not shown), the top mold section 110 is a unitary component having a ceiling with an annular sidewall.

The top disk 165 includes a top annular ridge 175 disposed thereon. The top annular ridge 175 may also be referred to as a top annular rib. The top annular ridge 175 is configured to contact a sidewall of the green tire and includes raised portions and indentations that will form a complementary shape on the sidewall of the green tire. The top annular ridge is defined by an outer ledge 180.

A top ring 185 is positioned against the top disk 165 about the top annular ridge 175, such that the interior edge of the top ring 185 abuts the outer ledge 180. The top ring 185 has a plurality of projections 190 that are configured to form voids in the second sidewall of the green tire. The top annular wall 170 may include an internal flange or lip (not shown in this view) that abuts the exterior edge of the top ring 185, such that the top ring 185 is sandwiched between the top annular ridge 175 and the top annular wall 170.

In an alternative embodiment (not shown), the top disk 165 does not include a top annular ridge 175. In such an embodiment, the top ring 185 is simply positioned on the top disk 165 at a desired location. In such an embodiment, the top ring 185 may be broader, and include the raised portions and indentations that are shown on the top annular ridge 175 in FIG. 3. Alternatively, the top ring 185 may be replaced with a solid disk having the raised portions and indentations that are shown on the top annular ridge 175 in FIG. 3.

The top mold section 110 further includes a plurality of top lugs 195. The top lugs 195 are void forming members that are configured to form a void in the second sidewall or tread of the green tire. In the illustrated embodiment, the plurality of top lugs 195 are removably attached to the top mold section 110. Each top lug may be attached to the top disk 165, the top annular sidewall 170, or both. Each top lug includes at least one aperture 200 configured to receive a fastener. Exemplary fasteners include bolds, screws, pegs, rivets, nails, or ties. In one known embodiment, at least one aperture 200 of each top lug 195 is aligned with an aperture 115 in one of the top disk 165 and the top annular sidewall 170, and a bolt (not shown) is passed through both apertures 115, 200 to secure the top lug 195 in position. The bolt may be fastened to a nut, or one or more of the apertures may be threaded. In an alternative embodiment (not shown), the top lugs 195 are fixedly attached to the top mold section 110. For example, the top lugs may be welded or riveted in place, or fixedly attached with an adhesive. Alternatively, the top lugs may be an integral extension of the top mold section 110.

In one embodiment, all of the top lugs 195 have substantially the same shape and dimensions, and are substantially the same as the bottom lugs 155. In one known embodiment, each bottom lug is approximately 5 inches (13 centimeters) deep, 4 inches (10 centimeters) wide, and 17 inches (43 centimeters) long. In an alternative embodiment, the bottom lugs 155 have a first shape and dimension, and the top lugs 195 have a second shape and dimension. In another alternative embodiment, the top lugs 195 have a plurality of different shapes. The top lugs may 195 have a depth ranging from 1 inch (3 centimeters) to 12 inches (30 centimeters), a width ranging from 1 inch (3 centimeters) to 12 inches (30 centimeters), and a length ranging from 3 inches (8 centimeters) to 40 inches (102 centimeters). However, it should be understood that the lugs may have any dimension for forming a void of a desired shape and dimension.

In one embodiment, at least some of the top lugs 195 are positioned such that they retain the top ring 185 against the top disk 165. In one particular embodiment, the top ring 185 does not have any apertures for receiving fasteners. The top lugs 195 may retain the top ring 185 with a friction fit. Alternatively, the top lugs 195 and the top ring 185 may be keyed, such that they have complementary projections and indentations to aid in retention.

While the illustrated embodiment depicts a tire mold 100 having a bottom ring 145, bottom lugs 155, a top ring 185, and top lugs 195, it should be understood that any of these components may be omitted. For example, in one embodiment, the bottom mold section 105 includes a bottom ring 145 and bottom lugs 155, while the top mold section 110 includes integrated void forming elements. In another alternative embodiment, the top mold section 110 includes a top ring 185 and top lugs 195, while the bottom mold section 105 includes integrated void forming elements.

In one embodiment, each of the bottom ring 145, bottom lugs 155, top ring 185, and top lugs 195 are constructed of the same material. Exemplary materials include stainless steel, aluminum, other metals, or a polymeric material. In an alternative embodiment, one or more of the bottom ring 145, bottom lugs 155, top ring 185, and top lugs 195 may be constructed of different materials.

Figure 4:
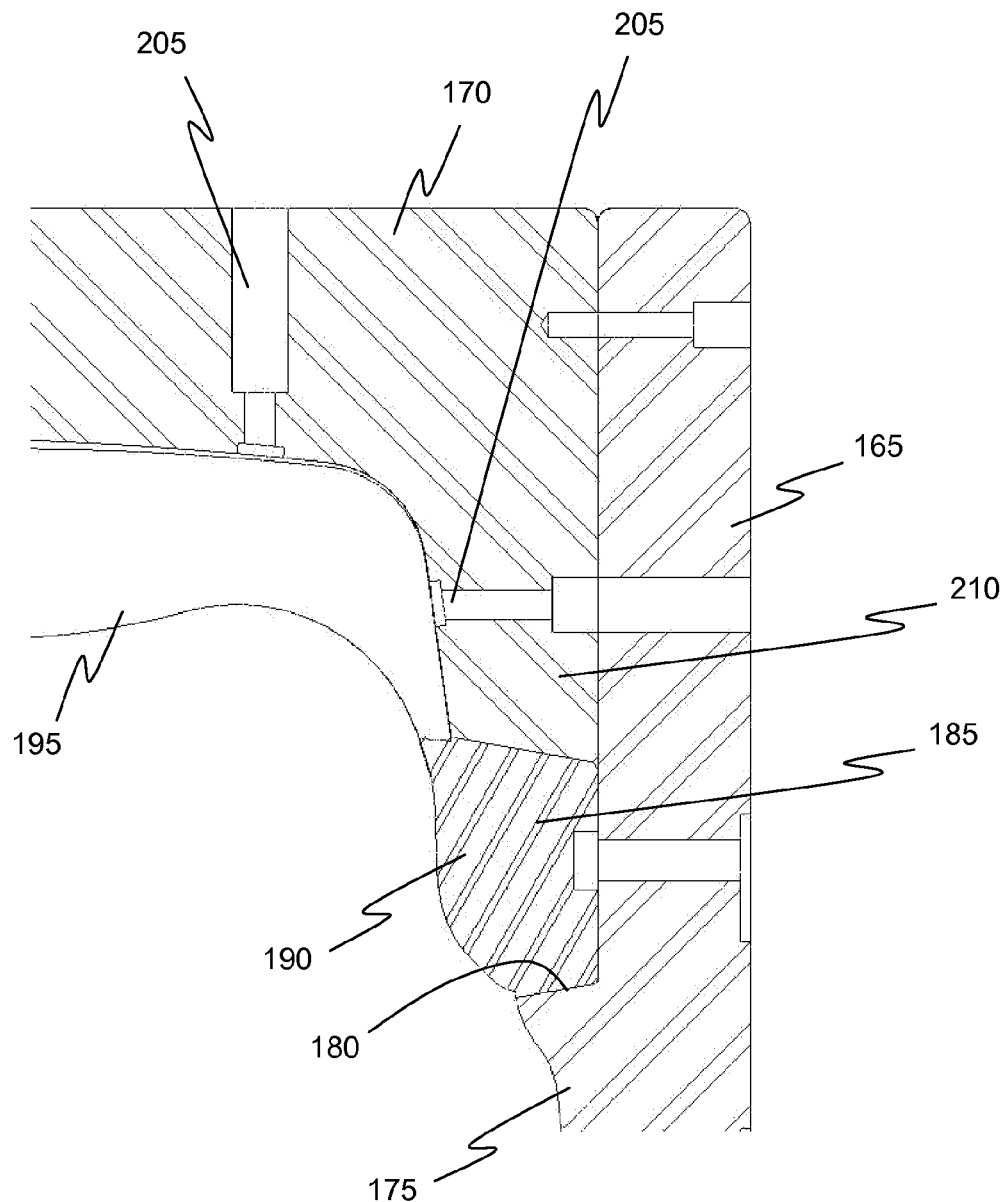
FIG. 4 is a partial cross-section of one embodiment of a lug and a ring inside a tire mold section.

FIG. 4 illustrates a partial cross-section of one embodiment of a top lug 195 and the top ring 185 inside the top mold section 110. It should be understood that the bottom lugs 155 and bottom ring 145 may have substantially the same configurations, including the alternatives described herein.

The top ring 185 is positioned on the top disk 165 about the top annular ridge 175 such that the interior edge of the top ring 185 abuts the ledge 180. Additionally, the annular wall 170 has an internal flange 210 (or lip) that abuts the exterior edge of the top ring 185, such that the top ring 185 is sandwiched between the top annular ridge 175 and the internal flange 210. In an alternative embodiment (not shown), the top ring 185 may be spaced from one of the top annular ridge 175 and the internal flange 210. In another alternative embodiment (not shown), the top annular wall 170 does not have an internal flange 210.

After the top ring 185 is so positioned, the top lugs 195 are removably attached to the top mold section 110 with bolts 205. The top lugs 195 are positioned such that each projection 190 of the top ring 185 is adjacent one of the top lugs 195. The top ring 185 dovetails to the plurality of top lugs 195 and the top lugs 195 retain the top ring 185 by a friction fit. In the illustrated embodiment, each projection 190 of the top ring 185 and the adjacent top lug 195 form a continuous surface. In an alternative embodiment (not shown), the projections 190 of the top ring 185 and the adjacent top lug 195 may form a broken surface.

It may be desirable to produce tires that have the same diameter and axial width, but having voids of different depths. For example, a manufacturer may produce a "deep skid" version of a tire having voids of a first depth, a "shallow skid" version of the tire having voids of a second depth shallower than the first depth, and a "plain tread" version of the tire, which does not include voids formed by lugs. It should be understood that any number of versions of a tire may be produced, and that the depth of the void may be selected to optimize performance in a given condition. For example, a deep skid version may perform better in muddy conditions.

Figure 5A:
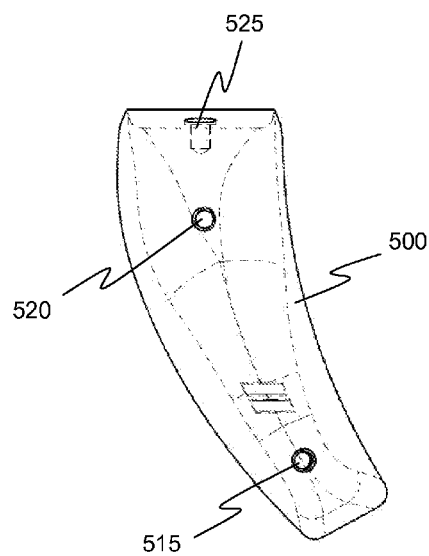
FIG. 5A is a rear view of one embodiment of a lug.
Figure 5B:
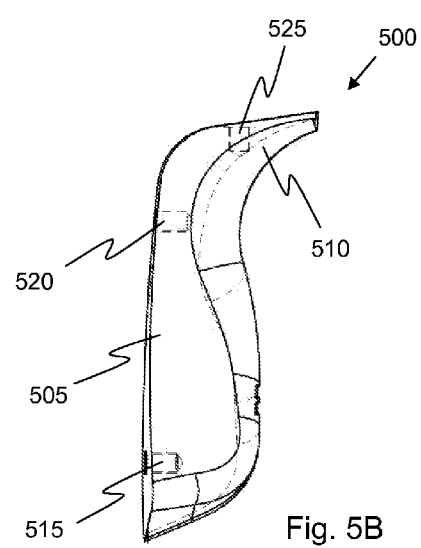
FIG. 5B is a side view of one embodiment of a lug.

FIGS. 5A and 5B illustrate a rear view and a side view, respectively, of one embodiment of a lug 500 that may be employed for a deep skid version of a tire. The lug 500 may be referred to as a deep lug or a first lug. However, it should be understood that this designation is merely for convenience, and a tire mold may be initially assembled for a shallow skid or a plain tread version of a tire.

The lug 500 has a major segment 505 extending in a first direction, and a minor segment 510 extending in a second direction. In the illustrated embodiment, the minor segment 510 is substantially orthogonal to the major segment 505. In an alternative embodiment (not shown) the minor segment 510 is disposed at an acute angle with respect to the major segment 505. In another alternative embodiment (not shown), the minor segment 510 is disposed at an obtuse angle with respect to the major segment 505.

The lug 500 may be employed as a top lug or a bottom lug. As explained above, the top lugs and the bottom lugs in a tire mold may all be substantially the same. Alternatively, lugs of different shapes and sizes may be employed.

The lug 500 includes a first aperture 515, a second aperture 520, and a third aperture 525 for receiving fasteners (not shown). The first aperture 515 and the second aperture 520 are disposed on the major segment 505 of the lug 500. The third aperture 525 is disposed on the minor segment 510 of the lug 500. The lug 500 is positioned in a tire mold such that the major segment 505 abuts a tread forming surface (e.g., bottom annular sidewall 130 or top annular sidewall 170), and is secured thereto with fasteners. Additionally, the minor segment 510 abuts a sidewall forming surface (e.g., top disk 125 or bottom disk 165), and is secured thereto with a fastener. It should be understood, however, that any number of apertures may be employed in each segment, as may be desired for securely fastening a lug to a mold.

Figure 6A:
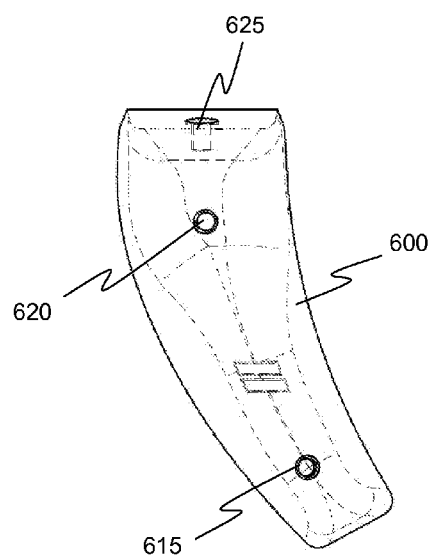
FIG. 6A is a rear view of one embodiment of a replacement lug.
Figure 6B:
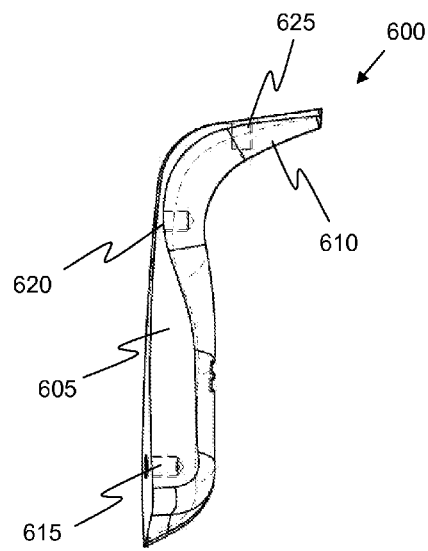
FIG. 6B is a side view of one embodiment of a replacement lug.

FIGS. 6A and 6B illustrate a rear view and a side view, respectively, of one embodiment of a lug 600 that may be employed for a shallow skid version of a tire. The lug 600 may be referred to as a shallow lug, a second lug, or a replacement lug. However, it should be understood that this designation is merely for convenience. In one embodiment, a tire mold may be initially assembled for a deep skid version of a tire with first lugs 500. The first lugs 500 may then be removed and replaced with replacement lugs 600 for making a shallow skid version of a tire. Then the replacement lugs 600 may later be removed for making a plain tread version of a tire. In alternative embodiments, a tire mold may be initially assembled for a shallow skid or a plain tread version of a tire, and then later modified to produce other versions.

The lug 600 has a major segment 605 extending in a first direction, and a minor segment 610 extending in a second direction. In the illustrated embodiment, the minor segment 610 is substantially orthogonal to the major segment 605. In an alternative embodiment (not shown) the minor segment 610 is disposed at an acute angle with respect to the major segment 605. In another alternative embodiment (not shown), the minor segment 610 is disposed at an obtuse angle with respect to the major segment 605.

The lug 600 may be employed as a top lug or a bottom lug. As explained above, the top lugs and the bottom lugs in a tire mold may all be substantially the same. Alternatively, lugs of different shapes and sizes may be employed.

The lug 600 includes a first aperture 615, a second aperture 620, and a third aperture 625 for receiving fasteners (not shown). The first aperture 615 and the second aperture 620 are disposed on the major segment 605 of the lug 600. The third aperture 625 is disposed on the minor segment 610 of the lug 600. The lug 600 is positioned in a tire mold such that the major segment 605 abuts a tread forming surface (e.g., bottom annular sidewall 130 or top annular sidewall 170), and is secured thereto with fasteners. Additionally, the minor segment 610 abuts a sidewall forming surface (e.g., top disk 125 or bottom disk 165), and is secured thereto with a fastener. It should be understood, however, that any number of apertures may be employed in each segment, as may be desired for securely fastening a lug to a mold.

Figure 7:
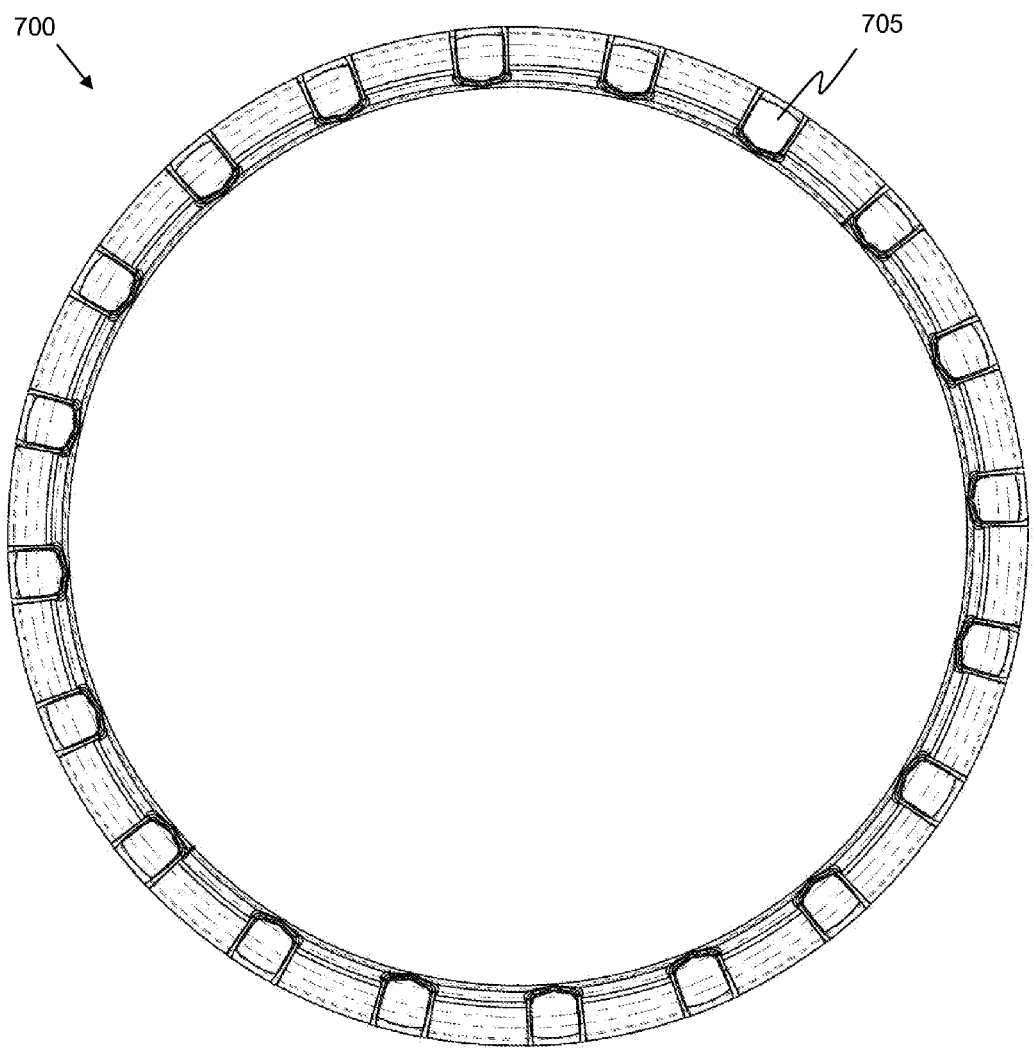
FIG. 7 is a front view of one embodiment of a ring.

FIG. 7 illustrates a front view of one embodiment of a ring 700 having a plurality of projections 705. In the illustrated embodiment, the ring has twenty projections 705. However, it should be understood that any number of projections may be employed.

The ring 700 may be employed as a top ring or a bottom ring. In one embodiment, the top ring and the bottom ring in a tire mold have substantially the same shape. In an alternative embodiment, the top ring and bottom ring have different shapes.

In the illustrated embodiment, the ring 700 does not include any apertures for receiving fasteners. Instead, the ring is configured to be held in a desired position by a friction fit or by a clamping action.

In one embodiment, the same ring may be employed for both a deep skid version of a tire, and a shallow skid version of a tire. In an alternative embodiment, a first ring is used for a deep skid version of a tire, and a second ring is used for a shallow skid version of a tire. The ring may be removed from the tire mold for a plain tread version of a tire.

Figure 8:
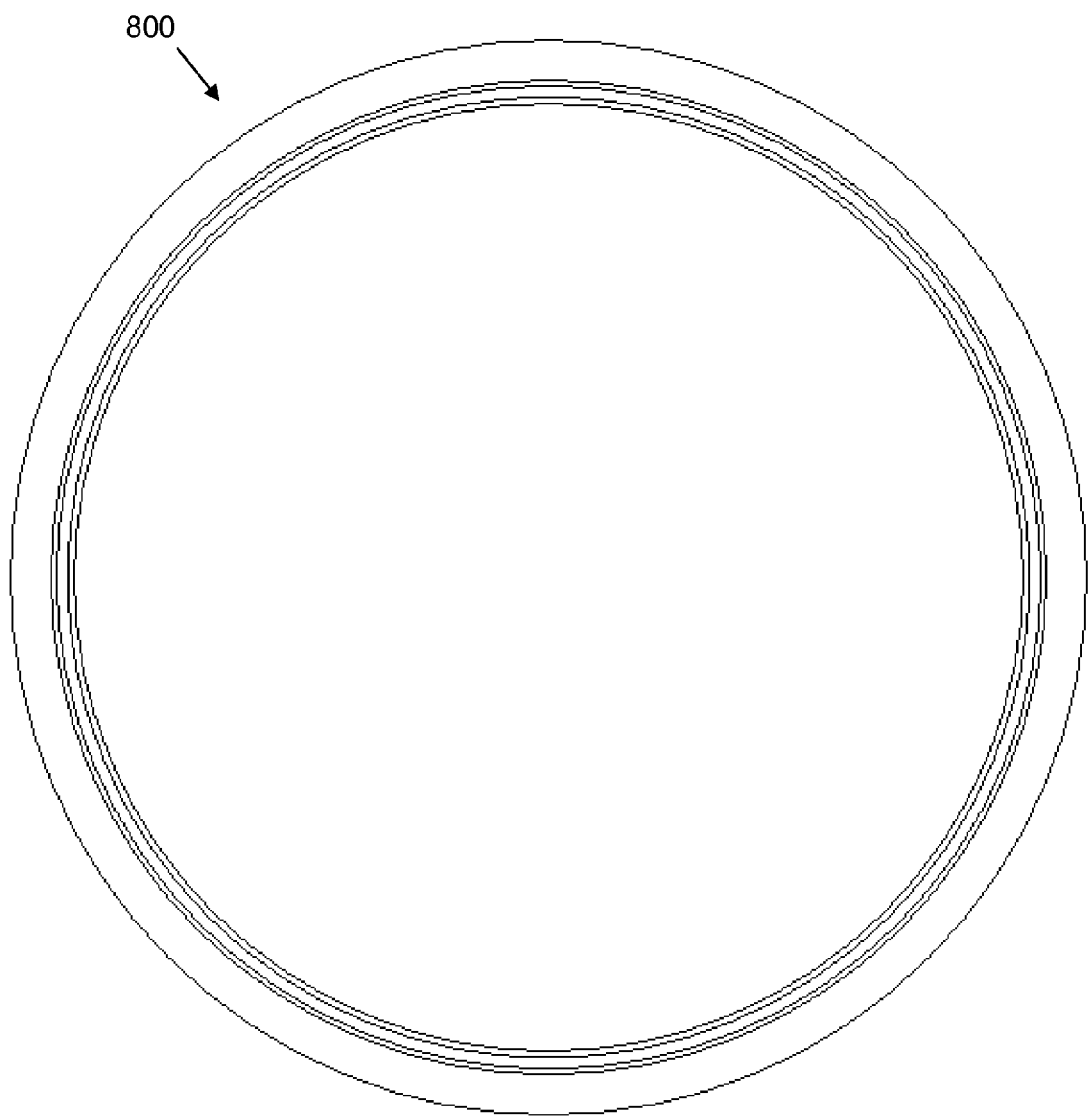
FIG. 8 is a front view of one embodiment of a replacement ring.

FIG. 8 illustrates a front view of one embodiment of a replacement ring 800 for a plain tread version of a tire. The replacement ring 800 does not have any projections, but instead has a smooth surface. The ring 800 does not include any apertures for receiving fasteners. Instead, the ring is configured to be held in a desired position by a friction fit or by a clamping action.

Figure 9A:
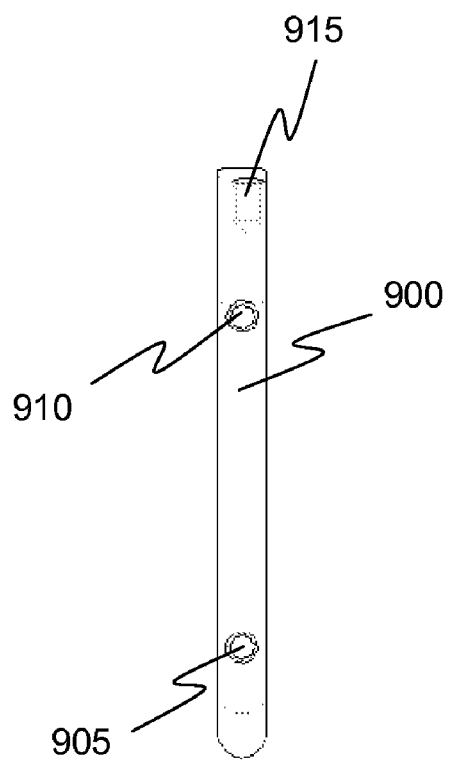
FIG. 9A is a rear view of one embodiment of a second replacement lug.
Figure 9B:
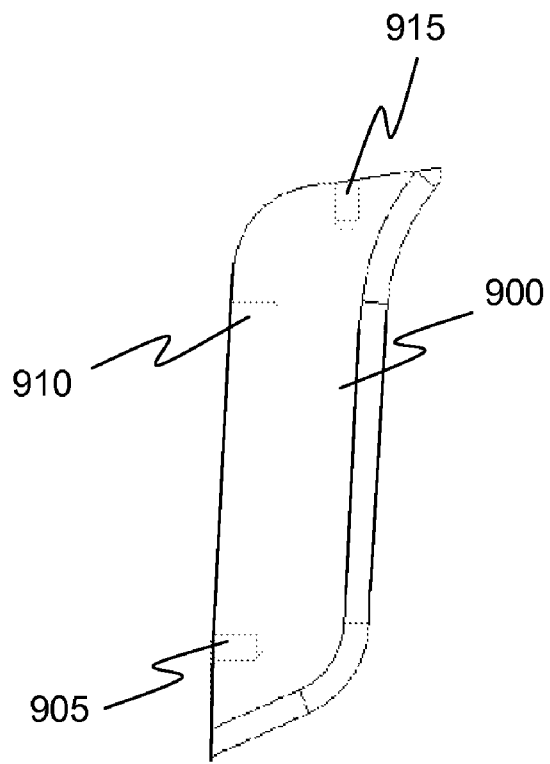
FIG. 9B is a side view of one embodiment of a second replacement lug.

FIGS. 9A and 9B illustrate a rear view and a side view, respectively, of one embodiment of a lug 900 that may be employed for a plain tread version of a tire. The lug 900 may be referred to as a plain tread lug, a third lug, or an additional replacement lug. However, it should be understood that this designation is merely for convenience. In one embodiment, a tire mold may be initially assembled for a deep skid version of a tire with first lugs 500. The first lugs 500 may then be removed and replaced with replacement lugs 600 for making a shallow skid version of a tire. Then the replacement lugs 600 may later be removed and replace with additional replacement lugs 900 for making a plain tread version of a tire. In one embodiment, only two additional replacement lugs 900 are employed in the top mold section and another two additional replacement lugs 900 are employed in the bottom mold section. The additional replacement lugs 900 are shorter and thinner than the other lugs. They may be used to produce voids in the tire that serve as tread wear indicators.

The lug 900 includes a first aperture 905, a second aperture 910, and a third aperture 915 for receiving fasteners (not shown). It should be understood, however, that any number of apertures may be employed in each segment, as may be desired for securely fastening a lug to a mold.

The lug 900 may be employed as a top lug or a bottom lug. As explained above, the top lugs and the bottom lugs in a tire mold may all be substantially the same. Alternatively, lugs of different shapes and sizes may be employed. For example, in one alternative embodiment, the top mold section includes shallow lugs and the bottom mold section includes deep lugs. In another alternative embodiment, the bottom mold section includes shallow lugs and the top mold section includes deep lugs. In yet another alternative embodiment, each mold section includes a mixture of deep lugs and shallow lugs. In still another alternative embodiment, each mold section includes a mixture of deep lugs, shallow lugs, and plain tread lugs. In yet another alternative embodiment, lugs of different shapes not shown may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire mold kit comprising:
   a bottom mold section having a bottom cavity configured to define a first sidewall of a tire and a first portion of a tread of a tire;
   a top mold section having a top cavity configured to define a second sidewall of the tire and a second portion of the tread of the tire;
   a top ring having a plurality of projections configured to form voids in the second sidewall of the tire; and
   a plurality of void forming members removably attached to the top mold section, wherein the plurality of void forming members retain the top ring in a fixed position against the top mold section.

2. The tire mold kit of claim 1, wherein each of the plurality of projections of the top ring is adjacent one of the plurality of void forming members.

3. The tire mold kit of claim 1, wherein the plurality of void forming members are removably attached to the top mold section by a plurality of bolts.

4. The tire mold kit of claim 1, further comprising a plurality of replacement void forming members having dimensions different from the plurality of void forming members.

5. The tire mold kit of claim 4, wherein the plurality of replacement void forming members are configured to be removably attached to the top mold section after the plurality of void forming members are removed, wherein the plurality of replacement void forming members retain the top ring in a fixed position against the top mold section.

6. The tire mold kit of claim 1, further comprising a bottom ring having a plurality of projections configured to form voids in the first sidewall of the tire, and a plurality of lower void forming members removably attached to the bottom mold section, each of the plurality of lower void forming members being configured to form a void in at least one of the first sidewall and the first portion of the tread of the tire.

7. The tire mold kit of claim 6, wherein the plurality of lower void forming members retain the bottom ring in a fixed position against the bottom mold section.

8. The tire mold kit of claim 7, further comprising a plurality of replacement lower void forming members having dimensions different from the plurality of lower void forming members.

9. A tire mold comprising:
a bottom mold section having a bottom cavity;
a plurality of bottom lugs removably attached to the bottom mold section;
a bottom ring having a plurality of projections,
wherein the plurality of bottom lugs retain the bottom ring in a fixed position against the bottom mold section, and
wherein each of the plurality of projections of the bottom ring is adjacent one of the plurality of bottom lugs;
a top mold section having a top cavity;
a plurality of top lugs removably attached to the top mold section; and
a top ring having a plurality of projections,
wherein the plurality of top lugs retain the top ring in a fixed position against the top mold section, and
wherein each of the plurality of projections of the top ring is adjacent one of the plurality of top lugs.

10. The tire mold of claim 9, wherein each of the projections of the bottom ring and the adjacent one of the bottom lugs form a continuous surface.

11. The tire mold of claim 9, wherein each of the projections of the top ring and the adjacent one of the top lugs form a continuous surface.

12. The tire mold of claim 9, wherein the plurality of bottom lugs retain the bottom ring by a friction fit, and wherein the plurality of top lugs retain the top ring by a friction fit.

13. The tire mold of claim 9, wherein the bottom ring dovetails to the plurality of bottom lugs, and wherein the top ring dovetails to the plurality of top lugs.

14. The tire mold of claim 9, wherein the bottom mold section includes a bottom annular rib that abuts an inner surface of the bottom ring, and wherein the top mold section includes a top annular rib that abuts an inner surface of the top ring.

15. The tire mold of claim 9, wherein the top mold section is pivotally connected to the bottom mold section.

16. An apparatus for molding a tire, the apparatus comprising:
a first mold section having a first cavity, the first mold section having an annular ridge disposed thereon;
a second mold section having a second cavity;
a plurality of lugs removably attached to the first mold section; and
a ring having a plurality of projections, wherein the plurality of lugs retain the ring in a fixed position against the first mold section about the annular ridge.

17. The apparatus of claim 16, further comprising a second plurality of lugs removably attached to the second mold section.

18. The apparatus of claim 17, further comprising a second ring having a plurality of projections, wherein the second plurality of lugs retain the second ring in a fixed position against the second mold section.

19. The apparatus of claim 16, wherein each of the plurality of lugs includes at least one aperture for receiving a fastener.

20. The apparatus of claim 16, wherein the ring does not have any apertures for receiving fasteners.

* * * * *